(12) United States Patent
Ramb et al.

(10) Patent No.: US 11,060,249 B2
(45) Date of Patent: Jul. 13, 2021

(54) ADJUSTMENT OF THE LEVELING CYLINDER SETTING IN A ROAD FINISHER

(71) Applicant: JOSEPH VOEGELE AG, Ludwigshafen/Rhein (DE)

(72) Inventors: Horst Ramb, Worms (DE); Martin Buschmann, Neustadt (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 258 days.

(21) Appl. No.: 16/217,530

(22) Filed: Dec. 12, 2018

(65) Prior Publication Data
US 2019/0177930 A1 Jun. 13, 2019

(30) Foreign Application Priority Data

Dec. 13, 2017 (EP) .................................... 17206936

(51) Int. Cl.
*E01C 19/48* (2006.01)
*E01C 23/01* (2006.01)
*B60G 17/0165* (2006.01)

(52) U.S. Cl.
CPC ...... *E01C 19/4873* (2013.01); *B60G 17/0165* (2013.01); *E01C 19/48* (2013.01);
(Continued)

(58) Field of Classification Search
CPC .. E01C 2301/00; E01C 19/4873; E01C 19/48; E01C 23/01; B60G 2300/09; B60G 2300/32; B60G 2500/324
See application file for complete search history.

(56) References Cited

U.S. PATENT DOCUMENTS 3,901,616 A * 8/1975 Greening ............ E01C 19/4873
404/102
4,801,218 A * 1/1989 Musil ....................... B60G 3/01
404/101
(Continued)

FOREIGN PATENT DOCUMENTS

CN 1158930 A 9/1997
CN 101248235 A 8/2008
(Continued)

OTHER PUBLICATIONS

Indian Examination Report dated Dec. 19, 2019, Application No. 201814046928, Applicant Joseph Voegele AG, 5 Pages.
(Continued)

*Primary Examiner* — Abigail A Risic
(74) *Attorney, Agent, or Firm* — Brooks Kushman P.C.

(57) ABSTRACT

A road finisher includes an undercarriage, a chassis which is adjustable in height relative to the undercarriage, an electronic control system, and a paving screed which is attached to tie bars, the tie bars each being hinged to the chassis at a pull point and the pull points each being adjustable relative to the chassis by means of a leveling cylinder. The control system comprises a receiving unit configured to detect an actual pull point height, an evaluation unit configured to calculate a deviation of the actual pull point height from a target pull point height caused by a height adjustment of the chassis relative to the undercarriage, and a command unit, which is configured to automatically at least partially correct the deviation by a correction signal sent from the command unit causing a hydraulic controller to adjust at least one of the leveling cylinders.

18 Claims, 4 Drawing Sheets

(52) U.S. Cl.
CPC .......... *E01C 23/01* (2013.01); *B60G 2300/09* (2013.01); *B60G 2500/30* (2013.01); *E01C 2301/00* (2013.01)

(56) References Cited

U.S. PATENT DOCUMENTS

| | | | |
|---|---|---|---|
| 5,356,238 | A | 10/1994 | Musil et al. |
| 5,879,104 | A * | 3/1999 | Ulrich .................. E01C 19/407 404/102 |
| 6,352,386 | B2 | 3/2002 | Heims |
| 7,503,412 | B2 | 3/2009 | Francois |
| 8,079,776 | B2 | 12/2011 | Lossow |
| 8,454,266 | B2 | 6/2013 | Buschmann et al. |
| 8,894,323 | B2 | 11/2014 | Rutz et al. |
| 9,033,611 | B2 | 5/2015 | Hanfland et al. |
| 9,200,415 | B2 | 12/2015 | Graham et al. |
| 9,447,549 | B2 | 9/2016 | Buschmann et al. |
| 9,487,924 | B2 | 11/2016 | Bertz et al. |
| 9,540,778 | B2 | 1/2017 | Rutz et al. |
| 9,963,838 | B2 | 5/2018 | Oettinger |
| 10,287,734 | B2 | 5/2019 | Herzberg |
| 10,472,779 | B2 | 11/2019 | Schmidt et al. |
| 2015/0102571 | A1 | 4/2015 | Slawson |
| 2017/0072761 | A1 | 3/2017 | Slawson |

FOREIGN PATENT DOCUMENTS

| | | |
|---|---|---|
| CN | 201678934 U | 12/2010 |
| CN | 102304887 A | 1/2012 |
| CN | 202440745 U | 9/2012 |
| CN | 102747672 A | 10/2012 |
| CN | 102828458 A | 12/2012 |
| CN | 203866678 U | 10/2014 |
| CN | 203890844 U | 10/2014 |
| CN | 104652235 A | 5/2015 |
| CN | 205474744 U | 8/2016 |
| CN | 106414852 A | 2/2017 |
| CN | 205917579 U | 2/2017 |
| CN | 107268396 A | 10/2017 |
| CN | 209493799 U | 10/2019 |
| DE | 41 01 417 A1 | 10/1991 |
| DE | 197 09 131 A1 | 9/1998 |
| DE | 299 07 733 U1 | 9/1999 |
| DE | 299 23 118 U1 | 4/2000 |
| DE | 20010498 U1 | 9/2000 |
| EP | 0 849 398 A1 | 6/1998 |
| EP | 0849398 B1 | 9/2003 |
| EP | 2905378 A1 | 8/2015 |
| FR | 2633647 B1 | 1/1992 |
| JP | S58-163376 U | 10/1983 |
| JP | S60-34079 U | 3/1985 |
| JP | H10-183527 A | 7/1998 |
| JP | 2000-329107 A | 11/2000 |
| JP | 2001329507 A | 11/2001 |
| JP | 3131344 U | 5/2007 |

OTHER PUBLICATIONS

Japanese Office Action dated Dec. 9, 2019, Application No. 2018-231479—English Translation (Notice of Reasons for Refusal) Included, 10 Pages.
Extended European Search Report dated Jun. 25, 2018, Application No. 17206936.1-1002, Applicant Joseph Voegele AG, 4 Pages.
Indian First Examination Report dated Feb. 28, 2020, Application No. 201814047017—English Translation Included, 6 Pages.
Chinese First Office Action & Search Report dated Aug. 20, 2020 (with English Translation), Application No. 201811516087.2, Applicant Joseph Voegele AG, 24 Pages.
Chinese First Office Action & Search Report dated Sep. 3, 2020 (with English Translation), Application No. 201811516979.2, Applicant Joseph Voegele AG, 25 Pages.

* cited by examiner

ADJUSTMENT OF THE LEVELING CYLINDER SETTING IN A ROAD FINISHER

CROSS-REFERENCE TO RELATED APPLICATIONS

This application claims foreign priority benefits under 35 U.S.C. § 119(a)-(d) to European patent application number EP 17206936.1, filed Dec. 13, 2017, which is incorporated by reference in its entirety.

TECHNICAL FIELD

This present disclosure relates to a road finisher with a height-adjustable chassis, a paving screed and a leveling cylinder for adjusting the paving screed, as well as a method for controlling the leveling cylinder.

BACKGROUND

Modern road finishers shall be suitable for a wide range of applications and at the same time meet ever increasing demands in terms of paving quality and efficiency. In order to be able to precisely pave different layer thicknesses, road finishers are equipped, for example, with a height-adjustable chassis, as is known from EP0849398B1. This allows the required amount of material to be transported unhindered by a spreading auger to the paving screed which then compacts and smooths the material. The paving screed is connected to tie bars, which in turn are hinged to the chassis at pull points. The pull point height and therefore the angle of attack of the paving screed can be adjusted by means of leveling cylinders. In paving mode, the angle of attack defines the layer thickness when the paving screed is pulled over the material in a floating manner, so that a larger angle of attack results in a larger layer thickness.

SUMMARY

An object of the disclosure is to provide an improved control system for a road finisher.

A road finisher according to the disclosure comprises an undercarriage, which can be a crawler or wheeled undercarriage, a chassis adjustable in height relative to the undercarriage, an electronic control system and a paving screed attached to tie bars, the tie bars each being hinged to the chassis at a pull point and the pull points each being adjustable relative to the chassis by means of a leveling cylinder.

The control system comprises a receiver unit, an evaluation unit and a command unit. The receiving unit is configured and connected to detect a current actual pull point height. The evaluation unit is configured to calculate a deviation of the actual pull point height from an target pull point height caused by a height adjustment of the chassis relative to the undercarriage, and the control unit is configured to automatically correct the deviation in whole or in part by a correction signal sent by the control unit causing a hydraulic control to adjust at least one of the leveling cylinders. The pull point height is generally dependent on a height position of the chassis and the position of the cylinder piston of the leveling cylinder.

The height position of the chassis can be varied to process different quantities of a paving material, such as bituminous or concrete material for paving road pavements. Between the chassis and the paving screed there is a screw conveyor which distributes the material in sufficient quantity and thickness evenly in front of the screed. By adjusting the height position of the chassis, the screw conveyor is also adjusted so that the space in front of the paving screed is variable and can be set to a sufficient size to distribute sufficient material, but not too large to prevent the material from cooling down. The amount of material can therefore also be adjusted to different production speeds. The automatic correction of the paving screed's pull point enables the paving screed's angle of attack and thus the paving height of the material to be kept constant. No further intervention by the operator is required to maintain the paving height. In contrast to earlier systems, which only indirectly determined the need to control the pull point height by measuring the incorrect layer thickness of a road pavement already laid, this disclosure prevents the paving of the material with the incorrect layer thickness in advance. As described below, tables with corresponding assignment of layer thickness and pull point height can be stored in the control system.

In an advantageous variant, a scale installed on the undercarriage is configured to indicate the pull point height in relation to the ground. This can be, for example, a permanently installed scale with mechanical conversion on a crawler track. This allows the pull point height to be read directly by an operator who may be present in addition to a driver of the road finisher and who is next to the vehicle or on the paving screed. This supports the road finisher driver, as he is not the only person who has to monitor all parameters, and the second person can also directly compare changes to the pull point height or other screed settings with the paving result.

Usually, an electronic display integrated into the road finisher's control stand is configured to display the pull point height in relation to the ground. Such a display allows the driver to monitor the pull point height in addition to all other operating parameters, and the need for a second operator on the road finisher can at least temporarily be dispensed with. In addition, the display can also use visual and/or audible signals to draw attention to previously defined values, such as upper or lower limits. An electronic display makes it possible to provide further information simultaneously in a familiar manner. In this way, parameter combinations, such as driving speed and angle of attack, can also be indicated, which should be preferred or avoided with regard to production quality and efficiency.

In another practical embodiment, the target pull point height can be set by an operator, or a target layer thickness can be set by an operator and the control system is configured to convert the target layer thickness to the target pull point height, or the target pull point height is part of a set of parameters of an operating program that can be selected by the operator. In this way, the operator can select the operating parameters at the input devices of the control stand or at control terminals, which are available, for example, on the paving screed, so that these are automatically monitored by the control system as described. Since the target layer thickness of a road pavement is known in advance, it is particularly easy for the operator to predefine it and have it converted by the control system into the pull point height.

In a standard variant, the chassis is connected to the undercarriage at a pivot point at the front end of the road finisher at a fixed height with reference to the ground. The chassis can be adjusted in height by lifting and lowering it at its rear end, i.e., the discharge end, whereby the chassis rotates around the pivot point. The height adjustment of the chassis is used in particular to vary the space directly in front of the paving screed, so that the amount of paving material that can simultaneously be distributed and processed by the screw conveyor in front of the paving screed is also variable. It is therefore sufficient to adjust the height of the chassis at its discharge end. A lifting mechanism at the front end of the road finisher can therefore be dispensed with, which reduces production and maintenance costs.

Another possible variant includes a sensor for detecting the pull point height, preferably at or adjacent to the leveling cylinder. The sensor can be a mechanical sensor, such as a pendulum or ski sensor, or an electronic sensor, such as an ultrasonic or laser sensor. Such a sensor delivers exact measured values and can be easily read electronically. If the sensor is attached directly to the paving screed's pull point, it can directly measure the actual pull point height. Alternatively, the sensor can also be mounted on the chassis and measure its height position on the leveling cylinder and combine it with a position of a cylinder piston to determine the pull point height. This would require an additional sensor to measure the travel distance of the cylinder piston. A combination of the position of the cylinder piston and the height position of the chassis in the area of the leveling cylinder can also be done centrally by the evaluation unit of the electronic control system.

The control system preferably comprises a memory unit suitable for storing parameters entered by an operator as well as parameters determined during operation, in particular the pull point height. In this way, the values measured during operation can be compared with existing specifications in the sense of a feedback mechanism, and the control system can mechanically readjust in the event of deviations. The memory unit can also store sets of parameters assigned to a specific operating program. Such an operating program can then be selected by the operator. This allows the control system to automatically control the leveling cylinder during operation, as described above. In addition, parameter combinations such as speed and screed angle, which have proven to be advantageous, can be stored and reused. In addition, sets or tables of parameters, such as pull point height and layer thickness, can be stored and displayed to the operator for selection on an electronic display.

The road finisher described is configured and capable of performing a method to automatically control a pull point height of a leveling cylinder as described below. Features described with respect to the method can be transferred to the road finisher and vice versa.

A method according to the disclosure for automatically controlling a pull point height of a leveling cylinder of a road finisher, wherein the road finisher comprises an electronic control system and a chassis adjustable in height relative to an undercarriage, and wherein a tie bar is hinged to the chassis and the leveling cylinder, comprises the following method steps:

Adjustment of the height of the chassis relative to the undercarriage,

Determination of a current actual pull point height,

Calculation of a deviation of the actual pull point height from a target pull point height caused by the height adjustment, Transmission of a correction signal to a hydraulic control system to adjust the leveling cylinder and thus correct the deviation completely or at least partially. This method usually takes place before paving starts. However, it is also possible to check the actual pull point height and, if necessary, the subsequent method steps during operation. The method is also used if the requirements for paving, in particular the intended layer thickness, change. As already mentioned, the method is automated and requires no operator intervention.

In a particularly advantageous variant, the control system calculates the pull point height on the basis of the height position of the chassis. As explained in the Figure description below, the height position is the only parameter measured at the discharge end of the chassis. With the known geometric relations, the pull point height can be determined. This is a very simple possibility and only one sensor is needed to measure the height position at the discharge end (rear end) of the chassis. Alternatively, as described above, the pull point height can be determined with a sensor and transferred to the control system for processing.

In the following, embodiments according to the disclosure are described in more detail with reference to the attached drawings.

BRIEF DESCRIPTION OF THE DRAWINGS

Components corresponding to each other are provided with the same reference numerals in the Figures.

DETAILED DESCRIPTION

Figure 1:
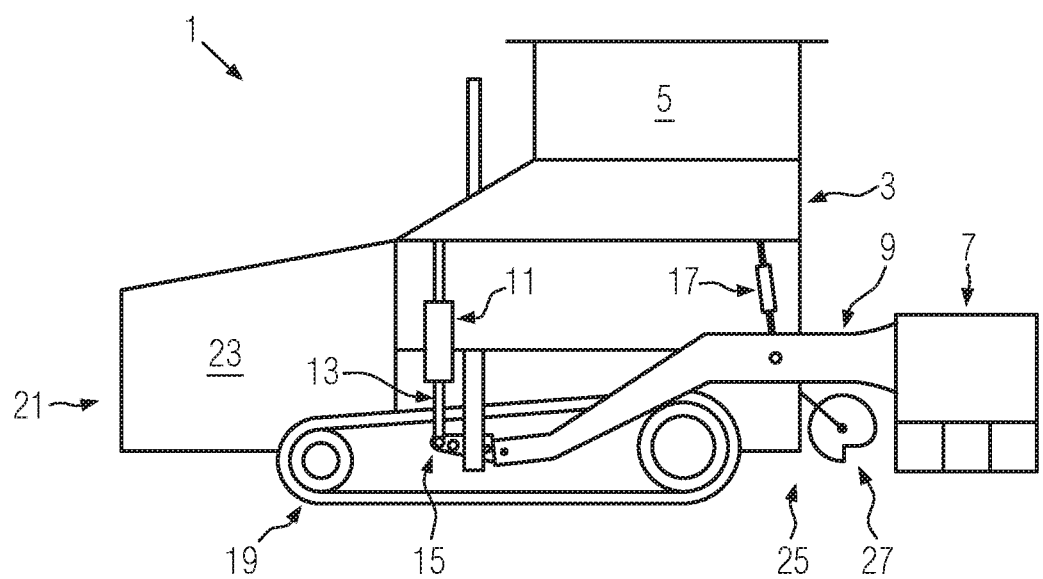
FIG. 1 shows a side view of a road finisher with a height-adjustable chassis and a leveling cylinder.

FIG. 1 shows an embodiment of a road finisher 1 according to the disclosure in a side view. The road finisher 1 comprises a chassis 3, which is height-adjustable relative to an undercarriage 19, and which is shown here in a lower basic position and has a control stand 5. In addition, the road finisher 1 comprises a paving screed 7, which can be interchangeable or laterally extendable. The paving screed 7 is connected to a tie bar 9, which is hinged to a leveling cylinder 11 or its piston rod 13, if necessary via one or more hinges. A pull point 15 defines the hinged connection between the leveling cylinder 11 and the tie bar 9. A piston 17 may be used to lift the paving screed 7 during service interruptions. During operation, the piston 17 is unloaded so that the paving screed 7 floats on the paving material. The paving screed 7 is usually hinged to the right and left sides of the road finisher 1 by a tie bar 9. The height-adjustable chassis 3 is mounted on an undercarriage 19, which is shown here as a crawler undercarriage, but can also be a wheeled undercarriage. At its front end 21, the road finisher 1 has a bulk material hopper 23 in which a supply of paving material is stored and from which it is transported by a conveyor belt through a tunnel (not shown) to the discharge end (rear end) 25 of the road finisher 1, where it is distributed evenly over the entire width of the paving screed 7 by a screw conveyor 27.

Figure 2:
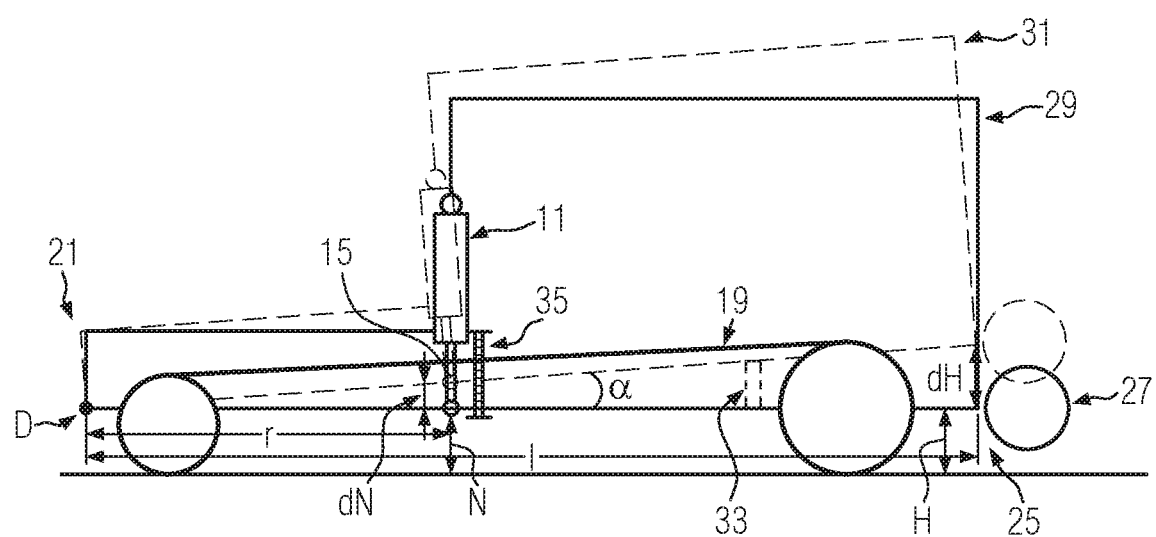
FIG. 2 shows a side view of the road finisher with the height-adjustable chassis in a lower basic position and in an upper lifted position.

FIG. 2 shows a side view of the road finisher 1 with the height-adjustable chassis 3 in a lower basic position 29 and (in dotted lines) in an upper lifted position 31. The chassis 3 is lifted relative to the undercarriage 19 by means of a lifting mechanism 33, which can be hydraulic, for example, whereby the chassis 3 remains connected to the undercarriage 19 at a constant height at its front end 21 and rotates about the pivot point D. Thus, both the rear end 25 of the chassis 3 and the pull point 15 move essentially on a circular path around the pivot point D. Lifting the chassis 3 also lifts the conveyor screw 27, which increases the space in front of the paving screed 7 and allows more material to be paved.

As described above, the change in the pull point height dN can either be determined by a sensor or derived from the change in the height of the chassis dH:

The height position H of the chassis 3 or the change of the height position dH of the chassis 3, measured at its discharge end 25, as well as a distance 1 of the discharge end 25 from the pivot point D and a distance r of the pull point 15 from the pivot point D are known, as well as alpha the angle, which the lifted chassis 3 encloses with the horizontal, then results with $$\sin(alpha)=dH/1=dN/r$$

the change of the pull point height $dN=dH*r/l$.

A mechanical scale 35 installed on the undercarriage 19 can indicate the change in the pull point height dN or the absolute pull point height N with reference to the ground.

Figure 3:
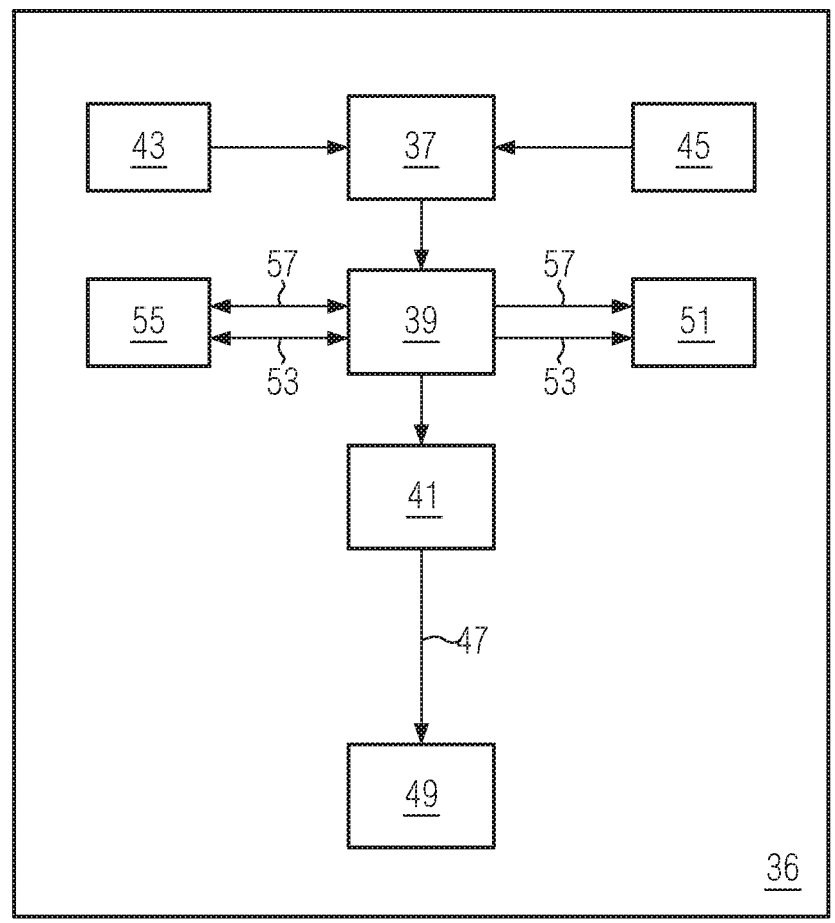
FIG. 3 shows a schematic view of an electronic control system with its associated components.

FIG. 3 shows a schematic view of an electronic control system 36 of the road finisher 1 with its associated components. A receiving unit 37 can receive a current actual pull point height N, supplied by a first sensor 43, and the height position H of the chassis 3, supplied by a second sensor 45, and forward it to an evaluation unit 39, which calculates a deviation of the actual pull point height N from a target pull point height either from the supplied actual pull point height N or the height position H of the chassis 3 according to FIG. 2. The command unit 41 can then send a corresponding correction signal 47 to a hydraulic control 49. An electronic display 51 can display the measured and calculated parameters 53 at the control stand 5, and a memory unit 55 can be written with them and they can be read out again from the memory unit 55. The memory unit 55 is also used to store parameter sets that are assigned to specific operating programs 57 and can be selected by the operator.

Figure 4:
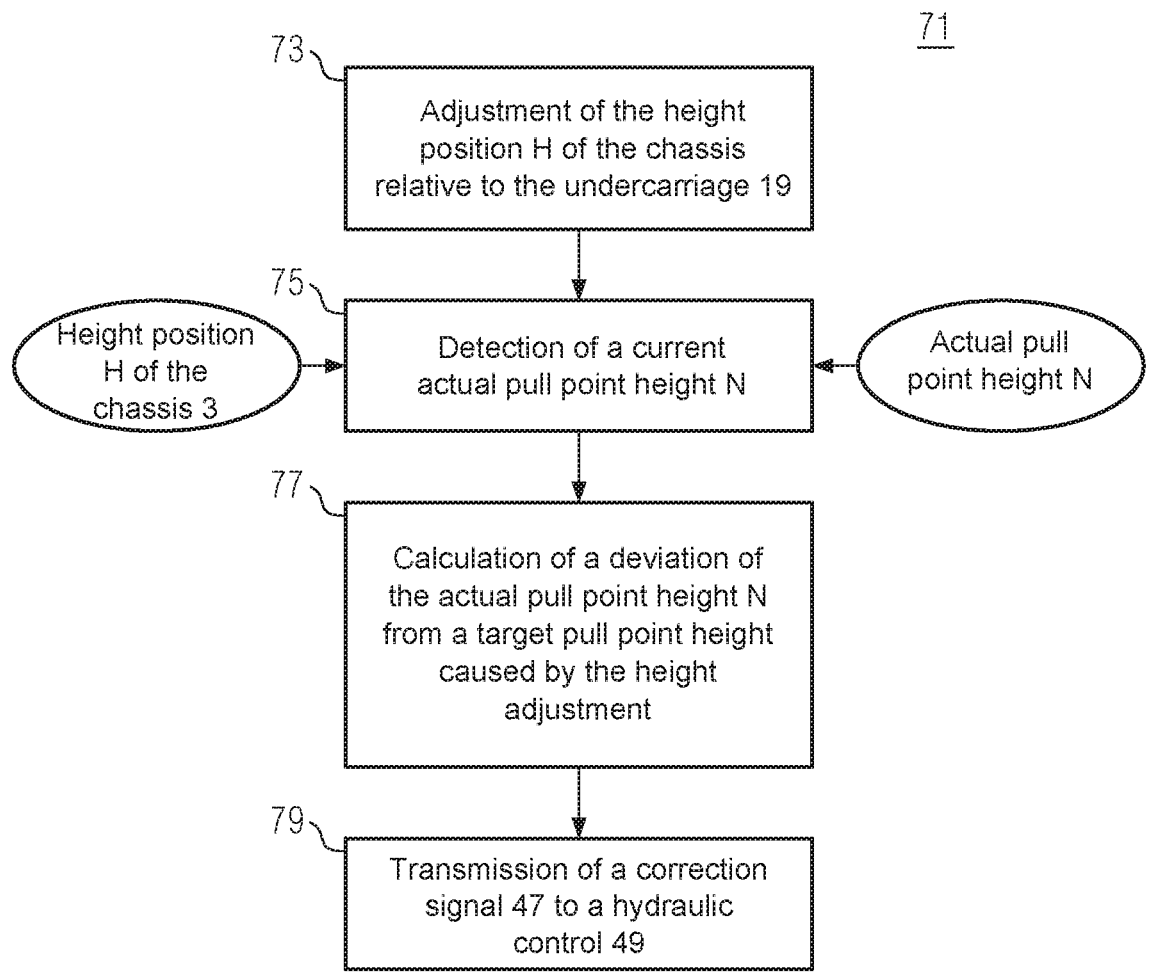
FIG. 4 shows a schematic view of a method for automatically controlling a pull point height of the leveling cylinder.

FIG. 4 shows a schematic view of method 71 for automatically controlling a pull point height N of the leveling cylinder 11. As explained above, method 71 comprises four steps 73, 75, 77, 79:

73—Adjustment of the height position H of the chassis 3 relative to the undercarriage 19, 75—Detection of a current actual pull point height N, 77—Calculation of a deviation of the actual pull point height N from a target pull point height caused by the height adjustment, 79—Transmission of a correction signal 47 to a hydraulic control 49 to adjust the leveling cylinder 11 and thus correct all or part of the deviation.

The input values for the method 71 are the actual pull point height N and, if applicable, the height position H of the chassis 3.

Based on the embodiments described for a road finisher 1 with automatic adjustment of the leveling cylinder setting, many variations of the same are conceivable. For example, the electronic control system 36 can be decentralized with separate units (receiving, evaluation and command units), but also in the form of a conventional data processing structure with a central processor unit.

What is claimed is:

1. A road finisher comprising:
an undercarriage;
a chassis adjustable in height relative to the undercarriage;
a paving screed;
tie bars attached to the paving screed, the tie bars each being hinged to the chassis at a pull point and the pull points being adjustable relative to the chassis by means of a leveling cylinder in each case; and
an electronic control system including a receiving unit, an evaluation unit and a command unit, the receiving unit being configured to detect a current actual pull point height without a sensor for detecting the pull point height, the evaluation unit being configured to calculate a deviation of the actual pull point height from a target pull point height caused by a height adjustment of the chassis relative to the undercarriage, and the command unit being configured to automatically at least partially correct the deviation by sending a correction signal to cause a hydraulic controller to adjust at least one of the leveling cylinders.

2. The road finisher according to claim 1 further comprising a scale installed on the undercarriage and configured to indicate the pull point height with respect to ground.

3. The road finisher according to claim 1 further comprising a control stand and an electronic display integrated on the control stand and configured to display the pull point height with respect to ground.

4. The road finisher according to claim 1 wherein the target pull point height can be preset by an operator or a target layer thickness can be preset by an operator, and the control system is configured to convert the target layer thickness into the target pull point height, or the target pull point height is part of a set of parameters of an operating program selectable by the operator.

5. The road finisher according to claim 1 wherein a target layer thickness can be preset by an operator, and the control system is configured to convert the target layer thickness into the target pull point height.

6. The road finisher according to claim 1 wherein the chassis is connected at a pivot point at a front end of the road finisher to the undercarriage at a fixed height with respect to ground, and the chassis is height-adjustable by lifting and lowering at its discharge end so that the chassis rotates about the pivot point.

7. The road finisher according to claim 1 wherein the control system comprises a memory unit for storing parameters entered by an operator and parameters determined during operation.

8. A method for automatically controlling a pull point height of a leveling cylinder of a road finisher, the road finisher including an electronic control system, a chassis which is adjustable in height relative to an undercarriage, and a tie bar hinged on the chassis and the leveling cylinder, the method comprising:
adjusting a height position of the chassis relative to the undercarriage;
determining a current actual pull point height;
calculating a deviation of the actual pull point height from a target pull point height caused by the height adjustment; and
transmitting a correction signal to a hydraulic controller to adjust the leveling cylinder and thereby at least partially correct the deviation;
wherein the control system calculates a change in height (dN) of the pull point from a change in height (dH) of the chassis at its discharge end, a distance (r) of the pull point from a pivot point and a distance (l) of the discharge end from the pivot point by means of the formula dN=dH*r/l.

9. The method according to claim 8 wherein the control system calculates the actual pull point height on the basis of a height position of the chassis.

10. The method according to claim 8 wherein a sensor determines the pull point height and transmits the pull point height to the control system.

11. A road finisher comprising:
an undercarriage;
a chassis adjustable in height relative to the undercarriage;
a paving screed;
tie bars attached to the paving screed, the tie bars each being hinged to the chassis at a pull point and the pull points being adjustable relative to the chassis by means of a leveling cylinder in each case; and
an electronic control system including a receiving unit, an evaluation unit and a command unit, the receiving unit being configured to detect a current actual pull point height, the evaluation unit being configured to calculate a deviation of the actual pull point height from a target pull point height caused by a height adjustment of the chassis relative to the undercarriage, and the command unit being configured to automatically at least partially correct the deviation by sending a correction signal to cause a hydraulic controller to adjust at least one of the leveling cylinders, wherein the control system is configured to calculate a change in height (dN) of the pull point from a change in height (dH) of the chassis at its discharge end, a distance (r) of the pull point from a pivot point and a distance (l) of the discharge end from the pivot point by means of the formula $dN=dH*r/l$.

12. The road finisher according to claim 11 further comprising a scale installed on the undercarriage and configured to indicate the pull point height with respect to ground.

13. The road finisher according to claim 11 further comprising a control stand and an electronic display integrated on the control stand and configured to display the pull point height with respect to ground.

14. The road finisher according to claim 11 wherein the target pull point height can be preset by an operator or a target layer thickness can be preset by an operator, and the control system is configured to convert the target layer thickness into the target pull point height, or the target pull point height is part of a set of parameters of an operating program selectable by the operator.

15. The road finisher according to claim 11 wherein a target layer thickness can be preset by an operator, and the control system is configured to convert the target layer thickness into the target pull point height.

16. The road finisher according to claim 11 wherein the chassis is connected at a pivot point at a front end of the road finisher to the undercarriage at a fixed height with respect to ground, and the chassis is height-adjustable by lifting and lowering at its discharge end so that the chassis rotates about the pivot point.

17. The road finisher according to claim 11 wherein the control system comprises a memory unit for storing parameters entered by an operator and parameters determined during operation.

18. The road finisher according to claim 11 wherein the receiving unit is configured to detect the current actual pull point height without a sensor for detecting the pull point height.

* * * * *